W. R. WINANS.
SUPPORT AND PROTECTOR FOR FRUIT BEARING TREES.
APPLICATION FILED NOV. 29, 1913.
1,128,087.
Patented Feb. 9, 1915.
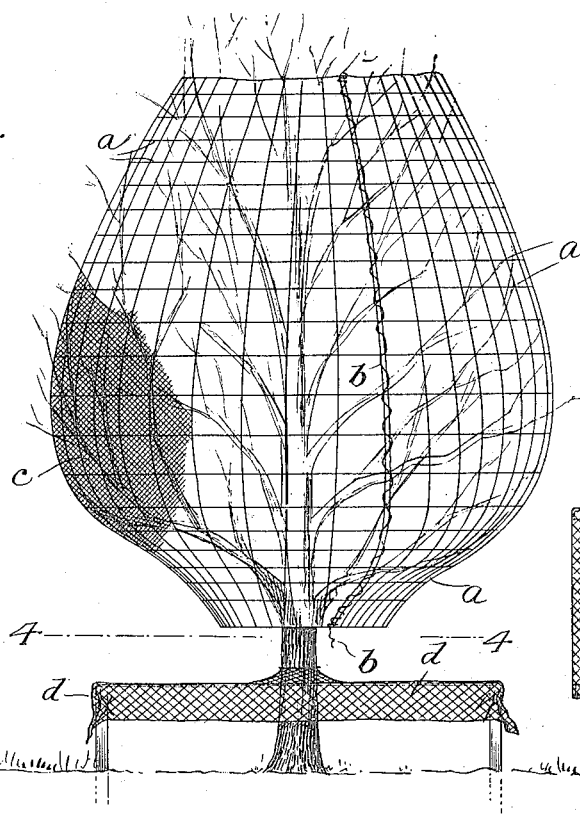
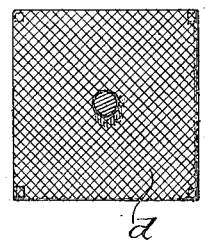
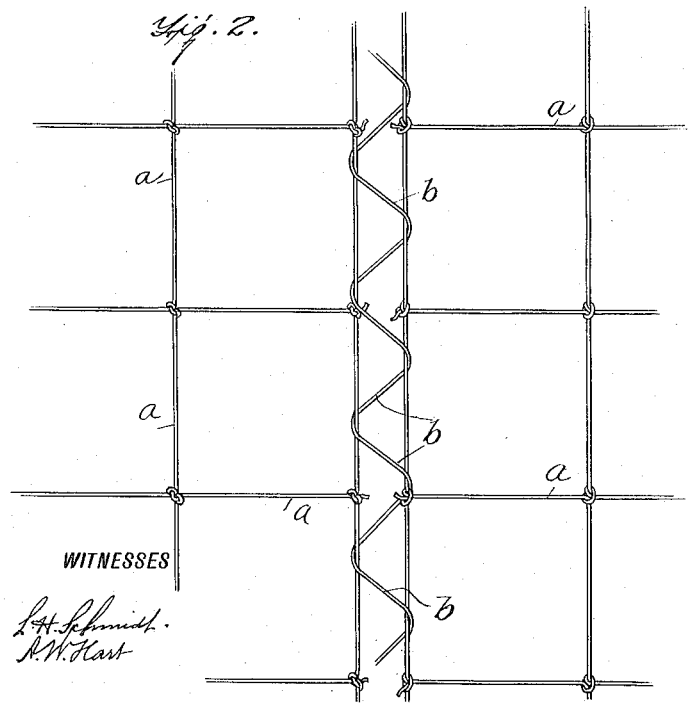
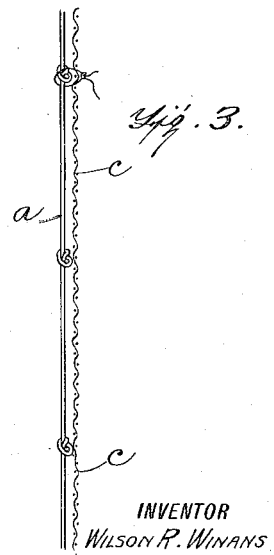
WITNESSES
INVENTOR
Wilson R. Winans
BY
ATTORNEYS

UNITED STATES PATENT OFFICE.

WILSON ROSS WINANS, OF WINANS CITY, OREGON.

SUPPORT AND PROTECTOR FOR FRUIT-BEARING TREES.

1,128,087. Specification of Letters Patent. Patented Feb. 9, 1915.

Application filed November 29, 1913. Serial No. 803,722.

*To all whom it may concern:*

Be it known that I, WILSON ROSS WINANS, a citizen of the United States, and a resident of Winans City, in the county of Hood River and State of Oregon, have invented an Improved Support and Protector for Fruit-Bearing Trees, of which the following is a specification.

My invention is an improved substitute for tree props such as are ordinarily used for supporting the limbs of fruit-laden trees.

The details of construction and arrangement of the invention are as hereinafter described, and illustrated in the accompanying drawing, in which—

Figure 1 is a view showing my invention applied to a tree. Fig. 2 is a face or plan view of a portion of a coarse-mesh netting serving as the support proper for tree limbs. Fig. 3 is a sectional view showing a fine-mesh netting or mosquito fabric secured to the coarse-mesh base or supporter. Fig. 4 is a cross section on the line 4—4 of Fig. 1.

As shown in Figs. 1 and 2, the supporter for fruit-laden tree limbs is composed of netting $a$ formed of cord or wire and having a very coarse mesh. The entire covering for a tree applied as shown in Fig. 1 may be composed of sections or broad strips of this netting, the same being suitably connected at the contiguous side edges. When applied to a tree, a preliminary measurement is required, and then, the netting having been made up in the required dimensions, it is applied around the tree, and the edges which approximate on one side of the tree are laced together by a cord or wire $b$. The netting is open at the top but may be drawn inwardly or contracted more or less if preferred. It is left open at the bottom to provide for entrance when it is desired to pick the fruit without removing the netting, and also to provide for delivery of detached fruit into the landing net $d$. It will be seen that the netting conforms practically to the shape of a tree. It will be seen that the strands composing the netting come in contact with, and effectually support, the extremities of the limbs and thus indirectly support the fruit attached to, and pendent from, such limbs; yet the netting does not materially interfere with the passage of light, air, or moisture, so that the ripening of the fruit proceeds the same as if the netting were not applied. I treat a net with an adhesive to ensnare moths, and prevent them from depositing eggs.

To the basic support afforded by the coarse-mesh netting $a$, I attach a fine-mesh netting $c$, by means of cord, thread, or wire, as may be most convenient the same being arranged within the netting $a$. The netting $c$ will be made of such mesh as to successfully prevent access to the tree and fruit of moths and other injurious insects, and it will also prevent apples, pears, or like fruit from projecting through the coarser net, so that, when the fruit becomes self-detached, *i. e.*, by its own weight, it will be guided downward by the netting $c$, and delivered upon the landing-net $d$. Cords may extend from top of net over the tree to secure that portion of net in position.

The landing-net comprises a net proper which is rectangular and attached to and supported by four posts, also the tree-trunk.

What I claim is:—

1. The improved support for fruit-laden trees consisting of a netting adapted to conform to and inclose the extremities of the tree limbs, it being divided longitudinally and its approximated edges detachably connected when applied to a tree so that the net is supported entirely by contact with the tree limbs, the base of the netting being free and open, as and for the purpose specified.

2. The combined support and protector for fruit-laden trees, comprising a basic netting of coarse mesh and a netting of fine mesh adapted to exclude moths and similar insects, the same being secured to and arranged within the basic netting, as described.

WILSON ROSS WINANS.

Witnesses:
ALBERT P. REED,
L. A. HENDERSON.

Copies of this patent may be obtained for five cents each, by addressing the "Commissioner of Patents, Washington, D. C."